(12) United States Patent
Keskula et al.

(10) Patent No.: US 6,391,484 B1
(45) Date of Patent: May 21, 2002

(54) FUEL PROCESSOR TEMPERATURE MONITORING AND CONTROL

(75) Inventors: Donald H. Keskula, Webster, NY (US); Tien M. Doan, Columbia, MD (US); Bruce J. Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/347,407

(22) Filed: Jul. 6, 1999

(51) Int. Cl.⁷ .............................................. H01M 8/06
(52) U.S. Cl. .......................................... 429/13; 429/17
(58) Field of Search ............................. 429/13, 17, 22, 429/24, 26

(56) References Cited

U.S. PATENT DOCUMENTS

| | | |
|---|---|---|
| 4,128,700 A | 12/1978 | Sederquist |
| 4,293,315 A | 10/1981 | Sederquist |
| 4,555,454 A | 11/1985 | Shuster |
| 4,642,272 A | 2/1987 | Sederquist |
| 4,650,727 A | 3/1987 | Vanderborgh et al. |
| 4,659,634 A | 4/1987 | Struthers |
| 4,670,359 A | 6/1987 | Beshty et al. |
| 4,678,723 A | 7/1987 | Wertheim |
| 4,816,353 A | 3/1989 | Wertheim et al. |
| 4,923,768 A | 5/1990 | Kaneko et al. |
| 4,994,331 A | 2/1991 | Cohen |
| 5,248,567 A | 9/1993 | Amemiya et al. |
| 5,271,916 A | 12/1993 | Vanderborgh et al. |
| 5,272,017 A | 12/1993 | Swathirajan et al. |
| 5,316,871 A | 5/1994 | Swathirajan et al. |
| 5,366,821 A * | 11/1994 | Merritt et al. ................. 429/21 |
| 5,372,617 A | 12/1994 | Kerrebrock et al. |
| 5,429,886 A | 7/1995 | Struthers |
| 5,449,568 A * | 9/1995 | Micheli et al. ................ 429/20 |
| 5,484,577 A | 1/1996 | Buswell et al. |
| 5,484,666 A | 1/1996 | Gibb et al. |
| 5,518,705 A | 5/1996 | Buswell et al. |
| 5,518,828 A | 5/1996 | Senetar |
| 5,554,453 A | 9/1996 | Steinfeld et al. |
| 5,605,770 A | 2/1997 | Andreoli et al. |
| 5,637,415 A * | 6/1997 | Meltser et al. ................. 429/17 |
| 5,702,838 A | 12/1997 | Yasumoto et al. |
| 5,763,113 A | 6/1998 | Meltser et al. |
| 5,789,091 A | 8/1998 | Wozniczka et al. |

OTHER PUBLICATIONS

Szaniszlo, "The Advanced Low–Emissions Catalytic–Combustor Program: Phase I—Description and Status, " ASME#79–GT–192, no date available.
Krill et al., "Catalytic Combustion for System Applications, " ASME#79–HT–54, no date available.
Hall et al., "A Porous Media Burner for Reforming Methanol for Fuel Cell Powered Electric Vehicles, " SAE Paper #950095, no date availbale.
Natural Gas Power Plant System (a descriptive drawing), no date available.

* cited by examiner

Primary Examiner—Gabrielle Brouillette
Assistant Examiner—M. Wills
(74) Attorney, Agent, or Firm—Anthony Luke Simon

(57) ABSTRACT

In one embodiment, the method of the invention monitors one or more of the following conditions: a relatively low temperature value of the gas stream; a relatively high temperature value of the gas stream; and a rate-of-change of monitored temperature. In a preferred embodiment, the rate of temperature change is monitored to prevent the occurrence of an unacceptably high or low temperature condition. Here, at least two temperatures of the recirculating gas stream are monitored over a period of time. The rate-of-change of temperature versus time is determined. Then the monitored rate-of-change of temperature is compared to a preselected rate-of-change of value. The monitoring of rate-of-change of temperature provides proactive means for preventing occurrence of an unacceptably high temperature in the catalytic reactor.

17 Claims, 3 Drawing Sheets

FUEL PROCESSOR TEMPERATURE MONITORING AND CONTROL

CROSS REFERENCE TO CO-PENDING APPLICATION

This application discloses subject matter which is also disclosed and claimed in pending U.S. patent application Ser. No. 09/187,125, filed Nov. 5, 1998, Glenn W. Skala et al.

GOVERNMENT SUPPORT

The Government of the United States of America has right in this invention pursuant to Agreement No. DE-AC02-90CH10435 awarded by the U.S. Department of Energy.

FIELD OF THE INVENTION

This invention relates to processing a hydrocarbon fuel to produce hydrogen for a fuel cell and, more particularly, to a method and system for maintaining temperature control during fuel processing.

BACKGROUND OF THE INVENTION

Fuel cells have been used as a power source in many applications. Fuel cells have also been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a "membrane electrode assembly" (MEA) comprising a thin, proton transmissive, non-electrically conductive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution of the fuel cell's gaseous reactants over the surfaces of the respective anode and cathode catalysts. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation, assignee of the present invention, and having as inventors Swathirajan et al. A plurality of individual cells are commonly bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies which comprise the catalyzed electrodes, are relatively expensive to manufacture and require certain controlled conditions in order to prevent degradation thereof.

For vehicular applications, it is desirable to use a liquid fuel, preferably a hydrocarbon or alcohol, such as methanol (MeOH), or gasoline as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide. For example, in the steam methanol reformation process, methanol and water (as steam) are ideally reacted to generate hydrogen and carbon dioxide according to this reaction: $CH_3OH+H_2O \rightarrow CO_2+3H_2$. The reforming reaction is an endothermic reaction, which means it requires external heat for the reaction to occur.

Fuel cell systems which process a hydrocarbon fuel to produce a hydrogen-rich reformate for consumption by PEM fuel cells are known and are described in co-pending U.S. patent application Ser. Nos. 08/975,442 and 08/980,087, filed in the name of William Pettit in November, 1997, and U.S. Ser. No. 09/187,125, Glenn W. Skala et al., filed Nov. 5, 1998, and each assigned to General Motors Corporation, assignee of the present invention. In U.S. Pat. No. , 4,650,722, issued Mar. 17, 1987, Vanderborgh et al. describe a fuel processor comprising a catalyst chamber encompassed by combustion chamber which is in indirect heat transfer relationship with organic fuel which is heated thereby and reacted in the catalyst chamber.

The reaction in the fuel processor (reformer) must be carried out under controlled temperatures to preserve the integrity of the catalyst in the catalytic chamber. The catalyst chamber temperature must be low enough to prevent catalyst degradation, yet high enough to supply the quantities of fuel required by the fuel cell at high load demand.

SUMMARY OF THE INVENTION

The present invention is directed to an improved method and system to protect the integrity of catalyst material in a catalytic reaction chamber which constitutes a part of a fuel processor. The method of the invention is useable in a fuel processor which comprises one or more catalytic chambers and a heater housed in a common housing. Gases react in the reactors to form a product suitable for use in a fuel cell. The gases circulate in a stream through the heater and through one or more reactors in the common housing. Each catalytic reactor is downstream of the heater. The temperature of the gas stream is monitored in a location in the housing which is near the heater outlet. Preferably, the heater and catalytic reactor are positioned such that the catalytic reactor is downstream of the heater with the discharge end of the heater in fluid flow communication with an inlet of the catalytic reactor. Preferably, a portion of the gas stream recirculates in the housing in heat transfer relationship with one or more of the reactors. The fuel processor also includes means to inject hydrocarbon fuel into the stream of the recirculating gases. A fan or other means are provided to recirculate gases throughout the catalytic reactor and heater (heat exchanger).

The temperature is monitored between the discharge end of the heater and the inlet of a catalytic reactor, and the monitored temperature is compared to one or more preselected values. In one embodiment, the method of the invention monitors one or more of the following conditions: a relatively low temperature value of the gas stream; a relatively high temperature value of the gas stream; and a rate-of-change of monitored temperature. A relatively low monitored temperature condition indicates that the temperature within one or more of the catalytic chambers of the fuel processor is not adequate to provide the desired quality of hydrogen-containing gas for the fuel cell. A relatively high monitored temperature indicates temperature is possibly damaging to catalytic beds within the fuel processor. A rate-of-change of temperature is useful to indicate that an unacceptable temperature may soon be attained unless corrective action is taken to prevent it.

In a preferred embodiment, the rate of temperature change is monitored to prevent the occurrence of an unacceptably high or low temperature condition. Here, at least two temperatures of the recirculating gas stream are monitored over a period of time. The rate-of-change of temperature versus time is determined. Then the monitored rate-of-change of temperature is compared to a preselected rate-of-change value. The monitoring of rate-of-change of temperature provides proactive means for preventing the occurrence of an unacceptably high temperature in the catalytic reactor.

The method of the invention essentially, indirectly provides an indication of significant failure, such as cracked welds, leaks, and catalyst bed problems, by its measurement of temperature, and rate-of-change of temperature. The placement of the temperature monitoring device in the gas stream between the outlet of the heat exchanger and the inlet of a reactor effectively protects the catalyst beds which are very temperature sensitive. Therefore, it is a very cost effective approach to diagnosing overall system problems while also protecting key system components.

Advantageously, the present monitoring method is adaptable to, and easily implemented in, existing fuel cell systems which comprise a fuel processor. The present method can be implemented in existing process controllers. In addition, the present monitoring method is useable with a variety of fuel cell system fuel processors.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

In one aspect, the invention provides a method and system to protect the integrity of reformer catalyst beds in a fuel processor by monitoring the temperature within the reformer catalyst chamber of a fuel processor. In another aspect, a heater and at least one reformer catalytic reactor are in a common housing. Each catalytic reactor is downstream of the heater. Gases react in the reactors to form a product suitable for use in a fuel cell. The gases circulate in a stream through the heater and housing and through the first and second reformer reactors. The gas stream is recirculated a desired number of times. The temperature of the gas stream is monitored in a location in the housing which is near the heater outlet. Preferably, a portion of the gas stream recirculates in the housing in heat transfer relationship with one or more reactors. Another portion of the gas stream circulates through one or more reactors to produce the product for use in a fuel cell. In a preferred embodiment, two or more reactors are used, the gases exit the heater, circulate through the first reactor and then through subsequent reactor(s), and then exit the fuel processor for transport to the fuel cell.

Figure 1:
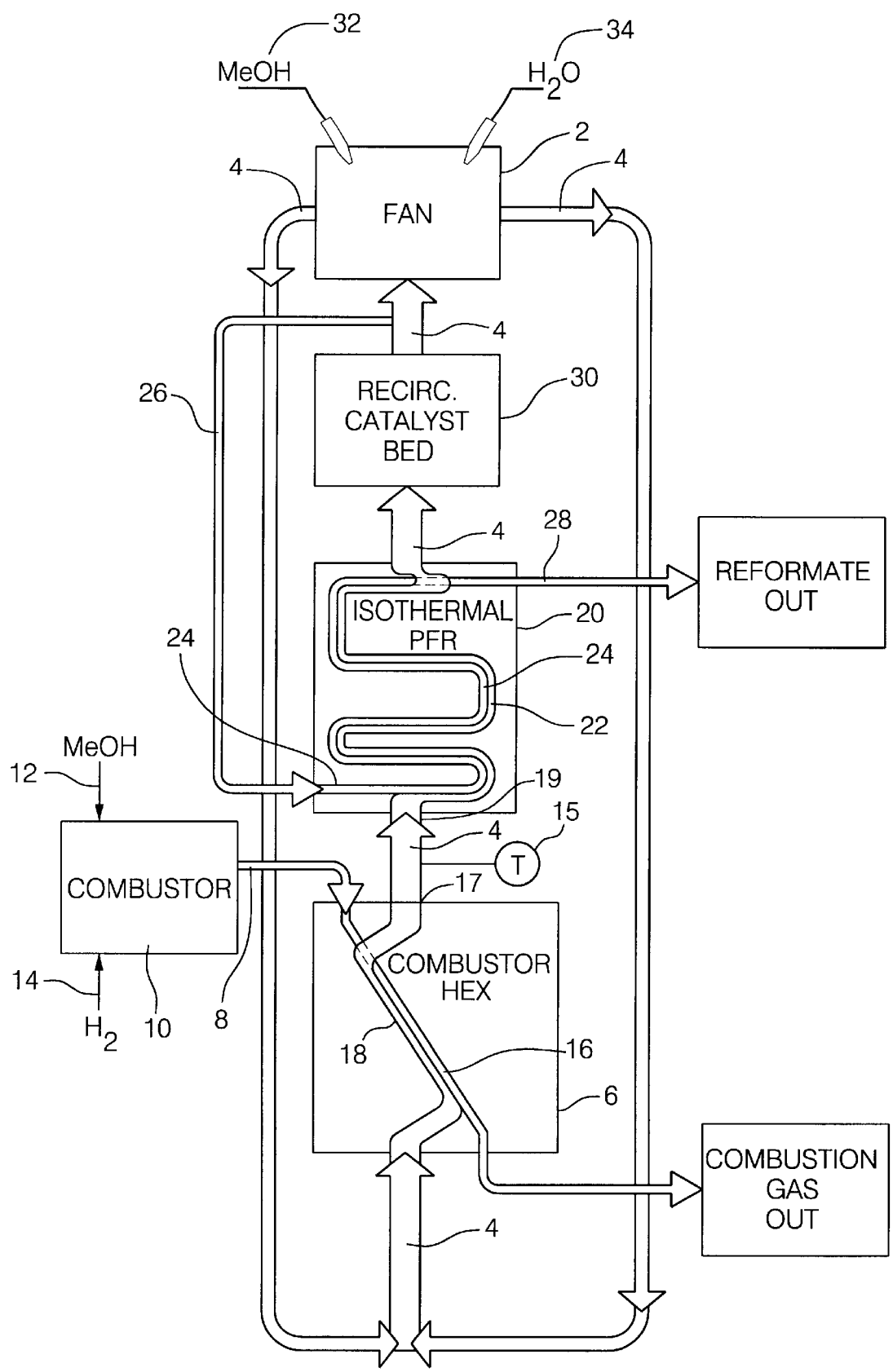
FIG. 1 is a schematic of one embodiment of the process of the present invention and illustrates a fuel processor including reformer for conversion of a hydrocarbon to an $H_2$-rich gas.

FIG. 1 schematically illustrates one embodiment of the fuel processor and process of the present invention, and the preferred positioning of the principal components (i.e., heater and reactors) of the invention. More specifically, FIG. 1 illustrates a recirculating fan 2 for circulating a gaseous stream 4 within the fuel processor such that the gas stream 4 exiting the fan 2 enters a gas-to-gas heat exchanger 6 which is heated by exhaust gases 8 from a combustor 10 which is preferably fueled by either methanol 12 from a methanol fuel tank and/or unused hydrogen 14 exiting the anode chambers of a fuel cell stack (not shown). The heat exchanger 6 includes a hot side defining passages 16 through which the hot combustion gases 8 flow, and a cold side defining passages 18 through which the gas stream 4 flows and absorbs heat from the combustion gases. Alternatively, the heat exchanger 6 could be replaced with an electric heater which during startup or system idle is energized externally of the fuel cell system (e.g., from a household wall socket) during startup. After the system is up and running, the heater is energized with current from the fuel cell, albeit at the expense of energy otherwise available from the fuel cell for more useful purposes (e.g., powering an electric vehicle).

Heated gas stream 4 exits the heat exchanger 6 and enters a first reactor 20 which is preferably an isothermal, plug-flow type reactor. As described further below, gas stream 4 is used to transfer heat to reactor 20 and a portion of gas stream 4 reactants passes through the catalyst side of reactor 20. A portion (e.g., up to 25%) of the circulating reactant stream is drawn off as stream 28 for further processing while the remainder continues to another reactor 30. Makeup reactants are then added to the recirculating reactants to compensate for those drawn off as stream 28.

The reactor 20 comprises a heat exchanger having a hot side defining first passages 22 through which the heated circulating gas stream 4 flows, and a cold side defining second passages 24 containing a suitable first catalyst (not shown). A small portion (e.g., up to about 25% by volume and preferably about 5%) of the gas stream 4 is shunted through the first catalyst to convert any residual water and methanol vapor therein to hydrogen and carbon dioxide which exits the reactor 20 as a reformate stream 28. The amount of medium shunted through the first catalyst is determined by, and in direct proportion to, the amount of makeup reactants (i.e., methanol and water) added to the circulating gas stream. The reformate stream 28 may thereafter further be subjected to a water-gas shift reaction and/or a preferential oxidation (PrOx) reaction as is well known to those skilled in the art in order to remove any excess carbon monoxide contained in the reformate stream. The gas stream 4 exits the first reactor 20 and enters a second reactor 30 which is essentially a second bed of catalyst (a.k.a. recirculation catalyst bed) through which the gas stream 4 flows in direct contact with the second catalyst to react a portion of the water vapor and methanol vapor contained in the gas stream 4 to form carbon dioxide and hydrogen in the circulating gas stream 4. Liquid methanol 32 and water 34 are injected into the housing, more preferably into the fan 2, to provide makeup for the gases exiting the housing as reformate stream 28.

A thermocouple 15 is located in the gas stream 4 between the outlet 17 of heat exchanger 6 and the inlet 19 of first reactor 20. Preferably thermocouple 15 is located adjacent the outlet 17 of heat exchanger 6, so that thermocouple 15 senses the temperature of the gas stream 4 just after being heated, indirectly, by combustion gases 8. Heat exchanger 6 has first passages 16 defining a path for hot combustion gases 8 and second passages 18 defining a path for gas stream 4. Respective passages are shown schematically in FIGS. 1 and 2.

The combustion gases 8 passing through the hot side passages 16 of the heat exchanger 6 heat the recirculating gas stream 4 in passages 18 to a temperature suitable for the circulating gas stream 4 to heat the reactor 20 sufficiently for it to carryout the methanol-water reaction set forth above. Therefore, the gas stream 4 is in indirect heat transfer relationship with the hot combustion gas stream 8 in heat exchanger 6. Combustion gases 8 from the combustor 10 enter the heat exchanger 6 at about 600 to 700° C. and exit at about 210 to 275° C. The temperature of the gas stream 4 exiting the heat exchanger 6 will depend on the nature, and hence needs, of the catalyst used in the reactors 20 and 30 and the proportion of the methanol-water reaction that it is to be performed in the reactor 20. Preferably, the temperature of the gas stream 4 exiting the heat exchanger 6 and entering the first reactor 20 will be about 260° C. in a system where about 50% methanol conversion occurs in each reactor 20 and 30 and each use a conventional copper-zinc catalyst. The methanol-water reaction occurring in the reactor 20 is endothermic hence causing the temperature of the circulating gas stream 4 to drop to about 250° C. as it exits the reactor 20 and enters the second reactor 30 which is adequate to heat the second catalyst bed therein sufficiently for it to promote the methanol and water reaction. Preferably, the second reactor is sized to react about 50% of the methanol and water content of the gas stream 4, and minimizes the amount of catalyst required by the whole system. The temperature of the gas stream 4 exiting the second catalyst 30 is about 240° C.

A portion of the recirculating gas stream 4 is diverted or shunted, into the cold side 24 of the first reactor 20 where the remaining water and methanol contained therein are reacted on the first catalyst. The portion 26 of the circulating gas stream 4 that is diverted/shunted into the first reactor 20 will comprise up to about 25% by volume of the recirculating gas stream 4, and preferably about 5% by volume of the recirculating gas stream 4. At the preferred 5% level, the two-stage reforming reaction is very efficiently effected using the minimum of total system catalyst.

The gas stream 4 exiting the second reactor 30 is drawn into the fan 2, and exhausted therefrom around the heat exchanger 6, first reactor 20 and second reactor 30 before entering the heat exchanger 6 so as to bathe the heat exchanger 6 and reactors 20 and 30 in hot gas. The gas stream 4 enters the heat exchanger 6 at a temperature of about 200–220° C. For optimal dispersion and atomization of the methanol 32 and water 34 into the gas stream 4, each is injected into the housing at the fan 2, and preferably such that they impinge upon the impeller of fan 2 which atomizes the droplets and accelerates their vaporization into the gaseous stream 4.

The reformate exiting the fuel processor as stream 28 will next have the carbon monoxide therein substantially removed (e.g., by water-gas shift and PrOx reactions) and then fed into the anode compartments of a hydrogen-oxygen fuel cell. Unconsumed hydrogen 14 exiting the anode compartment of the fuel cell may be used as fuel to fire the combustor 10, either alone or in combination with methanol from a methanol storage tank. Alternatively, the combustor 10 may be fueled solely by the methanol, especially during startup of the processor.

Figure 2:
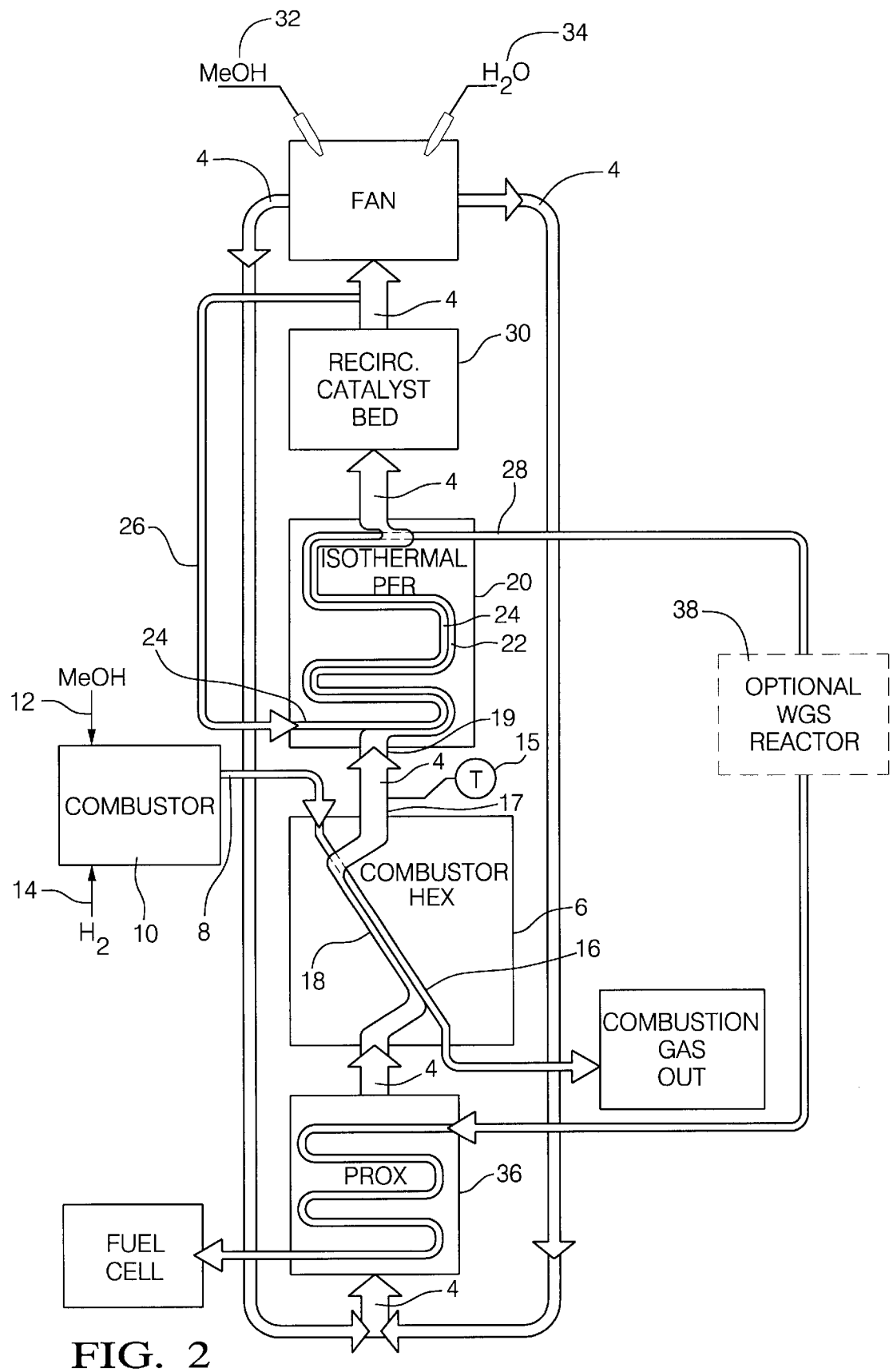
FIG. 2 is a schematic of a preferred embodiment of the process of the present invention and illustrates a fuel processor which includes reformer and PrOx reactor arranged to be contained in a common housing.

FIG. 2 depicts a preferred embodiment of the fuel processor system and process of the present invention. FIG. 2 is similar to FIG. 1 but also includes a preferential oxidation (i.e., PrOx) reactor 36 within the fuel processor housing near the heat exchanger 6. In the PrOx reactor 36, the reformate 28 exiting the first reactor 20 is reacted with oxygen/air under controlled conditions to preferentially oxidize any residual carbon monoxide in the reformate stream 28 without substantially consuming hydrogen in the reaction. PrOx reactors are known in the art and accordingly do not per se constitute a part of the present invention. The PrOx reaction is an exothermic reaction and adds heat to the gas stream 4 within the housing. Most preferably, the PrOx reactor operates at a lower temperature than the heat exchanger and is positioned upstream of the heat exchanger 6 so that the gas stream 4 flows first into the PrOx reactor and then into the heat exchanger 6 so that the heat generated in the PrOx reactor can be utilized to reduce the heat load on the heat exchanger 6.

As can be seen from the above description, the gas stream 4 functions as a heat transfer medium. It is heated by the heat exchanger 6, and is then circulated to one or more, preferably two, reactors 20, 30 which comprise the reformer, where the stream 4 supplies heat. In addition, the stream 4 absorbs heat from the PrOx reactor 36. The recirculating stream 4 eventually exits the process as a product stream, also referred to as reformate.

Optionally, a water-gas shift reactor 38 may be positioned in-line before the PrOx reactor 36 to pretreat the reformate 28 exhausting from the first reactor 20. Water-gas shift reactors are well known in the art and do not per se constitute part of the present invention. By properly controlling the reaction that occurs in the first and second reactors 20 and 30, respectively, the water-gas shift reaction can be caused to occur within the first and second reactors, and hence eliminate the need for a separate water-gas shift reactor 38.

Further background details concerning the construction and operation of the above-described fuel processor and associated fuel cell system can be had by referring to co-pending U.S. patent application Ser. No. 09/358,080, filed Jul. 21, 1999, in the names of David J. Hart-Predmore and William H. Pettit, and in co-pending U.S. patent application Ser. Nos. 08/975,442 now U.S. Pat. No. 5,887,276 and 08/980,087, now U.S. Pat. No. 6,077,620 filed in the name of William H. Pettit in November, 1997, and U.S. Ser. No. 09/187,125, now U.S. Pat. No. 6,238,815 Glenn W. Skala et al., filed Nov. 5, 1998, and each assigned to General Motors Corporation, assignee of the present invention, the entire contents of which are incorporated herein by reference.

Transients created by varying fuel demands of the fuel cell supplied by the fuel processor are preferably controlled by: (1) increasing or decreasing the amount of heat provided by the heat exchanger; (2) increasing or decreasing the flow rate and ratio of the methanol/water injected into the housing; and (3) varying the amount of air supplied to the PrOx reactor. Moreover, the speed of the fan can either be varied or held constant as the methanol and water throughput of the reformer varies. In this regard, varying the fan speed proportionally with the water/methanol throughput facilitates temperature control in the two reactors. On the other hand, a constant fan speed results in a variable temperature profile under transient load conditions. In either case, the attainment of a desired temperature is difficult to achieve. Therefore, the method and system as illustrated by FIG. 3 is necessary to protect the integrity of the catalyst from higher temperature degradation and to sense low temperature indicative of inadequate heat transfer and temperature for causing conversion of hydrocarbon to reformate.

In the method and configuration of the invention, a reformer temperature sensor 15 is located between the plug flow reactor 20 and the heat exchanger 6 in the fuel processor of FIGS. 1 and 2. By this arrangement, the temperature of the recirculating gas stream 4 is monitored at its hottest point, just as it exits the heat exchanger 6, and before it enters the first reformer reactor 20. This is the preferred location for temperature monitoring because in the reformer reactor the chemical reaction is endothermic and requires heat. If the temperature of the gas stream is too high or too low, it affects the quality of the reformate stream supplied to the fuel cell. If the rate of temperature rise of the recirculating stream is too high, it is an indication that a component for gas processing is out of control. The system is complex and comprises a number of components which work together to produce the desired result. If fan speed is too fast or too slow, the temperature of the reactors within the fuel processor, become either too low or too high. If methanol or water injection into the system is unexpectedly changed, for example, the supply of methanol is cutoff, then heat supplied to the reformer reactors for the reformation process will be excessive for the endothermic reformation process. The reformer catalyst beds themselves are characterized by a time constant specific to a particular reactor design. If there is a problem in the fuel processor, the reformer reactor may heat up faster than normally would be the case if the system were in balance, possibly resulting in an overheated and deteriorated catalyst bed. Another complexity is that the overall system works to balance the demand for hydrogen required by the stack, the excess hydrogen from the stack and the amount of methanol being supplied to the reformer and to the combustor. If any of these components is out of balance, transient conditions may result, some of which may be temporary and tolerable but others of which may result in a over-temperature condition which may be compounded as components progressively deviate from a desired running mode.

Under normal conditions, the rate of increase of the temperature of the reformer reactor beds is relatively slow, due to the thermal mass of the reformer beds and the distribution of heat from the recirculation fan in the fuel processor. If the rate of increase of this temperature is greater than a pre-determined value, stored in a memory, it is assumed that there is a problem, and a diagnostic is flagged, a call for action or response is issued. Response or corrective action can take many forms including an alarm, increasing water injected into the reformer, increasing fan speed, dumping heat to the atmosphere, reducing combustor power, reducing PrOx air, reducing reformer pressure, and also includes system shutdown. A rapid shutdown includes removing the hydrogen stream by dumping it to atmosphere. Alternatively, the hydrogen stream is routed to a storage facility.

Figure 3:
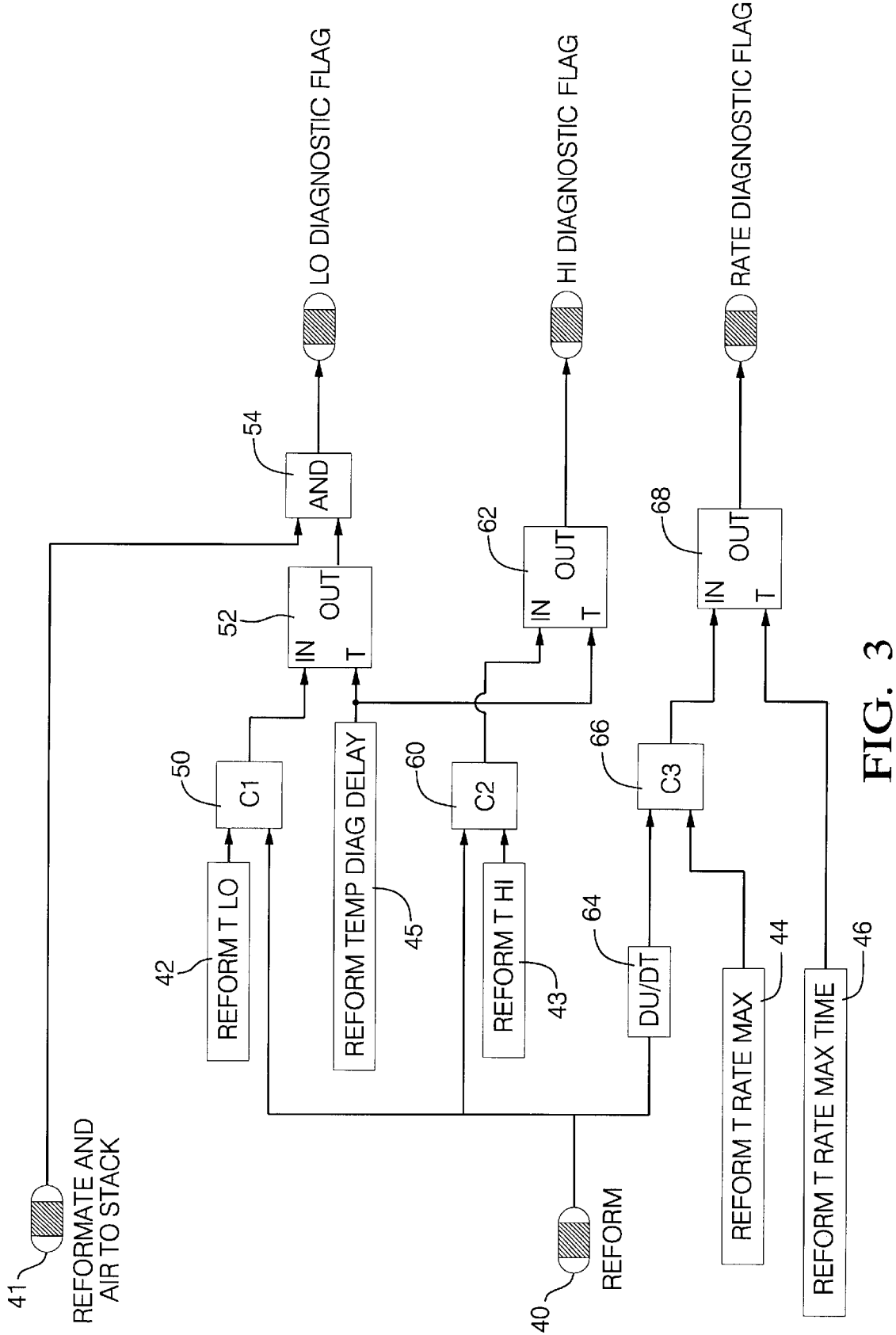
FIG. 3 is a schematic of a system for implementing a process as per the invention.

FIG. 3 is a schematic of a system for implementing a process as per the invention. FIG. 3 shows that two conditions of fuel cell system operation are monitored. The first is designated by a first input 40 labeled as REFORM temperature 40; the second is designated by a second input 41 corresponding to the monitoring of reformate, or air and reformate, being supplied to the fuel cell stack. It should be noted that, for ease of illustration, gas stream monitored temperature values, and calibration values in FIG. 3, are referred to by the shorthand designation REFORM. The monitored temperature values are for the gas stream 4 being recirculated through the fuel processor system of FIGS. 1 and 2.

As shown in FIG. 3, the temperature designated REFORM 40 is checked against a low temperature calibration value 42, a high temperature calibration value 43, and a rate-of-change calibration value 44. The low temperature condition, if coupled with a condition of reformate being supplied to the stack, results in a diagnostic flag. The high temperature condition also results in a diagnostic flag. If it is determined that the rate of temperature change, particularly temperature increase, exceeds a calibration value, a diagnostic flag results. Therefore, FIG. 3 contains three diagnostics, a low temperature diagnostic, a high temperature diagnostic, and a rate-of-change diagnostic. The temperature rate-of-change is determined as a function of time. The system of FIG. 3 comprises temperature comparing logic executed by software or hardware for: receiving inputs from temperature monitor 15; software or equivalent device for computing rate of temperature change; software comparator or equivalent device for comparing rate of temperature change to preselected values; and signal generator for providing an output signal when the monitored rate of temperature change is greater than or equal to the preselected rate-of-change value. Preferably, the logic, software or circuitry also include a time delay or equivalent device for blocking the signal for a selected time period. The system also includes devices for high and low temperature comparisons as described below in greater detail.

The high and low temperature monitoring, while useful, are reactive. Therefore, the proactive monitoring of rate-of-change of temperature is more desirable. The proactive monitoring of rate-of-change of temperature increase is most desirable for protecting catalyst beds. In a preferred embodiment, the rate of temperature change is intermittently determined over short time intervals to provide proactive monitoring. Such rate-of-change monitoring is most preferably coupled with high and low temperature condition detection and respective diagnostic flags.

In a preferred embodiment, the invention provides a relatively optimized location in the fuel processor for effective temperature monitoring. The preferred location provides the ability to monitor a temperature which approximately corresponds to the temperature of one or both reformer catalyst beds in reactors 20 and 30. Most preferably, the location is selected to monitor the temperature of stream 4, upstream of reactor 20. The selected location for monitoring the temperature of gas stream 4 in the fuel processor achieves several objectives, including protecting catalyst beds in reactors 20 and 30 from a high temperature condition, and avoiding supplying of reformate to the stack during the low temperature condition. It has been found in the preferred embodiment that it is effective, efficient, and adaptable from a hardware point of view, to conduct the temperature monitoring adjacent to, and downstream of, the outlet of the combustor heat exchanger 6. The temperature adjacent to, and downstream of, the outlet of the combustor heat exchanger 6 is representative of the temperature of gas stream 4 being supplied through the inlet of reactor 20. Since the reaction conducted in reactor 20 is endothermic, the outlet temperature of stream 4 from reactor 20 is less than the inlet temperature. Therefore, the hottest condition of the process gas stream 4 of the present invention is adjacent the outlet of the combustor heat exchanger 6.

The calibration values for high temperature condition, low temperature condition, and rate-of-change, may be included in look up tables, or based on plots, curves, empirical data or a mathematical model. Conveniently, the low temperature value and the high temperature value may be set and unchanged as a function of load or other system variable. It is preferred that the temperature rate-of-change calibration value be a function of the monitored temperature. In other words, as the monitored temperature increases, it is preferred that the rate-of-change calibration value decrease. Therefore, as the monitored temperature of the gas stream becomes hotter, the calibration rate-of-change temperature preferably declines.

Referring to FIG. 3, in step 50, a first software comparator (C1) compares two temperature values, the first being the monitored REFORM temperature 40 of the gas stream 4, and the second being a low temperature calibration value 42. An output signal from the comparator, indicating a low temperature condition, is subject to a first time delay in step 52. If the low temperature condition occurs for a period of time exceeding the time delay 45, a signal is sent to an AND function (gate) in step 54. The AND also receives a signal when reformate is being supplied to the stack. This ensures that this diagnostic is only enabled when the reformer is operating. If both a low temperature condition and a supply of reformate to the stack condition are met, a LO temperature diagnostic flag is indicated.

In another sequence, in step 60, a second comparator (C2) compares the monitored REFORM temperature 40 of the gas stream 4 to a high temperature calibration value 43. In the event a high temperature condition is sensed, that is, the monitored temperature equals or exceeds a high temperature calibration value, a signal is generated. However, the signal indicating a high temperature condition is subject to a time delay 45 in step 62. If the high temperature condition occurs for a period of time exceeding the second time delay, a HI diagnostic flag is indicated.

The last diagnostic sequence of FIG. 3 is used to monitor whether the rate of temperature change of the gas stream 4 exceeds a calibration value rate-of-change. In this situation, a thermocouple (15 of FIGS. 1 and 2) or similar device monitors at least two temperatures over at least two points in time. The rate of temperature change (du/dt) over the period of time is then calculated by hardware or software, preferably by software, in step 64. This rate is then compared to a maximum rate-of-change calibration value 44 by a third software comparator (C3) in step 66. If the temperature rate-of-change exceeds the calibration value for a period of time greater than the indicated third time delay 46 in step 68, then a signal is sent for a RATE diagnostic flag. The first, second and third time delays may be the same or different values.

It is evident that by the method of this invention, set points for triggering response or action can be either reactive or proactive, since the calibration values are preselected. The invention avoids problems within the fuel processor that can result in permanent system deterioration. In one alternative, the diagnostic algorithm shuts the system down before such deterioration can occur, but other remedial actions are also possible. The method of the invention can indirectly provide an indication of significant failures such as cracked welds, leaks, and catalyst bed problems, by its measurement of the temperature high, low, and rate-of-change, making it a very cost effective approach to diagnosing the system problems globally.

Although other alternative approaches are possible, the method and process of the invention are thought to be preferred for the following reasons.

One alternative is to implement direct feedback from the fuel processor fan to verify the fan is turning at a high enough speed. If the fuel processor fan speed is too low, this results in poor heat distribution within the reformer catalyst bed which may result in hot spots causing the temperature of the reformate stream to rise more quickly than normal which is a condition the present invention will detect. This alternative would require additional circuitry and software to determine if fuel processor fan speed is too low.

Another approach is to add a flow meter and/or pressure sensor on the methanol and water supply to the reformer injectors. If either or both the water and methanol injection rate is too low, temperature in the reform will increase at a higher rate than normal rate. This is the same condition the algorithm of the present invention detects without the need for added sensors and circuitry for the methanol and water injectors.

Another approach uses the temperature drop across the reformer heat exchanger to detect potentially the same type of failure as the rate-of-change calibration check implemented by a single temperature sensor. However, the temperature drop across the reformer requires the addition of another temperature sensor.

Each of the above alternatives is more costly. In order to obtain the same benefit as the present invention, the alternatives would be implemented collectively.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method for converting a hydrocarbon fuel into a gaseous product stream, that includes hydrogen for use in a fuel cell stack, comprising:
   (a) providing means to inject hydrocarbon fuel into a stream of recirculating gases;
   (b) positioning a heater and a catalytic reactor such that said catalytic reactor is downstream of said heater with a discharge end of said heater in fluid flow communication with an inlet of said reactor;
   (c) providing means to recirculate gases throughout said catalytic reactor and said heater;
   (d) recirculating said gases through said heater and catalytic reactor;
   (e) heating said recirculating gases in said heater;
   (f) monitoring a temperature of said recirculating gases between the discharge end of said heater and the inlet of said catalytic reactor at two or more points in time;
   (g) calculating the rate-of-change of said temperatures versus time; and
   (h) comparing said rate-of-change of temperature to a preselected rate-of-change value.

2. The method of claim 1 and further including generating an output signal when said calculated rate-of-change is greater than said preselected value.

3. The method of claim 2 and further comprising terminating operation of said fuel cell stack when said output signal is generated.

4. The method of claim 2 and further including blocking said signal for a period of time and terminating operation of said fuel cell stack when the time duration of said signal exceeds said time period.

5. The method of claim 1 wherein said monitoring step is conducted by monitoring the temperature of said stream of recirculating gases adjacent said discharge end of said heater.

6. A method for converting a hydrocarbon fuel into a gaseous product stream, that includes hydrogen for use in a fuel cell stack, comprising:

(a) providing means to inject hydrocarbon fuel into a stream of recirculating gases;

(b) positioning a heater and a catalytic reactor such that said catalytic reactor is downstream of said heater with a discharge end of said heater in fluid flow communication with an inlet of said reactor;

(c) providing means to recirculate gases throughout said catalytic reactor and said heater;

(d) recirculating said gases through said heater and catalytic reactor;

(e) heating said recirculating gases in said heater; and (f) monitoring the temperature of said recirculating gases between the discharge end of said heater and the inlet of said catalytic reactor.

7. The method of claim 6 wherein step (f) is conducted by monitoring at least two temperatures at different points in time; calculating the rate-of-change of said temperatures versus time; and comparing said rate-of-change of temperature to a preselected rate-of-change value.

8. The method of claim 7 and further including generating an output signal when said calculated rate-of-change is greater than said preselected value.

9. The method of claim 8 and further comprising terminating operation of said fuel cell stack when said output signal is generated.

10. The method of claim 8 and further including blocking said signal for a period of time and terminating operation of said fuel cell stack when the time duration of said signal exceeds said time period.

11. The method of claim 6 wherein said monitoring step is conducted by monitoring the temperature of said stream of recirculating gases adjacent said discharge end of said heater.

12. The method of claim 6 and further comprising generating an output signal when at least one of the following conditions are met:

(i) said monitored temperature is less than a first preselected temperature value and hydrogen-containing gas is being supplied to the fuel cell stack;

(ii) said monitored temperature is greater than a second preselected temperature value;

(iii) the rate-of-change of said monitored temperature is greater than a third preselected value.

13. The method of claim 12 and further comprising terminating operation of said fuel cell stack when said output signal is generated.

14. The method of claim 12 and further including blocking said signal for a period of time and terminating operation of said fuel cell stack when the time duration of said signal exceeds said time period.

15. The method of claim 6 and further including comparing said monitored temperature to a preselected temperature value.

16. The method of claim 15 and further including generating an output signal when said monitored temperature is greater than said preselected temperature value.

17. The method of claim 15 and further including generating an output signal when said monitored temperature is less than said preselected temperature value.

* * * * *